United States Patent
Ito et al.

(10) Patent No.: US 8,504,026 B2
(45) Date of Patent: Aug. 6, 2013

(54) RADIO COMMUNICATION APPARATUS AND RADIO COMMUNICATION METHOD

(75) Inventors: Hideto Ito, Kawasaki (JP); Kazuyuki Sato, Kawasaki (JP); Miki Sakai, Kawasaki (JP); Rei Tsuchiya, Chiba (JP); Manabu Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 431 days.

(21) Appl. No.: 12/769,230

(22) Filed: Apr. 28, 2010

(65) Prior Publication Data

US 2010/0291926 A1    Nov. 18, 2010

(30) Foreign Application Priority Data

May 18, 2009   (JP) .................................. 2009-119389

(51) Int. Cl.
*H04W 4/00* (2009.01)
*H04W 24/00* (2009.01)
*H04W 36/00* (2009.01)
*H04M 11/04* (2006.01)
*H04J 3/22* (2006.01)

(52) U.S. Cl.
USPC ........ 455/434; 455/425; 455/404.2; 455/436; 455/438; 370/338; 370/331; 370/465; 370/333; 370/332

(58) Field of Classification Search
USPC .......................... 455/434, 436; 370/338, 331
See application file for complete search history.

(56) References Cited

U.S. PATENT DOCUMENTS

| | | | |
|---|---|---|---|
| 6,282,431 B1 | 8/2001 | Konno | |
| 7,876,729 B1 * | 1/2011 | Grilli et al. | 370/332 |
| 2002/0056052 A1 * | 5/2002 | Nomura et al. | 713/500 |
| 2003/0002525 A1 * | 1/2003 | Grilli et al. | 370/465 |
| 2006/0251127 A1 | 11/2006 | Ishida et al. | |
| 2007/0008925 A1 * | 1/2007 | Dravida et al. | 370/331 |
| 2009/0042607 A1 * | 2/2009 | Adachi et al. | 455/556.1 |
| 2009/0227255 A1 * | 9/2009 | Thakare | 455/434 |
| 2009/0233574 A1 * | 9/2009 | Shinozaki | 455/404.2 |

FOREIGN PATENT DOCUMENTS

| | | | |
|---|---|---|---|
| GB | 2341752 | * | 9/1998 |
| JP | 5-165787 | | 7/1993 |
| JP | 11-136755 | | 5/1999 |
| JP | 2002-156478 | | 5/2002 |
| JP | 2006-270838 | | 10/2006 |
| WO | WO 2008/072313 | | 6/2008 |

* cited by examiner

*Primary Examiner* — Patrick N. Edouard
*Assistant Examiner* — Timothy Pham
(74) *Attorney, Agent, or Firm* — Staas & Halsey LLP

(57) ABSTRACT

A radio communication apparatus includes a radio communication unit which searches a connectable radio access network to be connected to at least one radio access network and receives broadcast information of the connected radio access network, and a control unit which connects the radio access network to the first radio access network detected by the search, checks whether or not the broadcast information includes time information, and connects the radio communication unit to a second radio access network detected by the search if the broadcast information does not include the time information.

6 Claims, 12 Drawing Sheets

FIG.6

| \u00a0 | NETWORK INFORMATION TABLE | | | 151 |
|---|---|---|---|---|
| COUNTRY CODE | NETWORK CODE | TYPE | TIME INFORMATION |
| 454 | XX | GSM | OK |
| | YY | W-CDMA | OK |
| 466 | ZZ | GSM | OK |
| | ZZ | W-CDMA | NG |
| ⋮ | ⋮ | ⋮ | ⋮ |

RADIO COMMUNICATION APPARATUS AND RADIO COMMUNICATION METHOD

CROSS-REFERENCE TO RELATED APPLICATIONS

This application is based upon and claims the benefit of priority from the prior Japanese Patent Application No. 2009-119389 filed on May 18, 2009, the entire contents of which are incorporated herein by reference.

FIELD

Various embodiments discussed herein relate to a radio communication apparatus and a radio communication method.

BACKGROUND

In recent years, a radio communication system such as a mobile phone system or a wireless Local Area Network (LAN) has been widely used. A radio communication apparatus such as a mobile phone using a radio communication service searches a surrounding radio access network, for example, when a power supply thereof is turned on. Then the radio communication apparatus is connected to a radio access network, detected by the search, to perform voice communication and data communication.

Most of the above-described radio communication apparatuses are provided with an internal clock. A time indicated by the internal clock may be used for various purposes. For example, the time is used to display a current time on a display provided in the radio communication apparatus. Furthermore, the time may be used for Digital Rights Management (DRM). That is, when voice data or image data acquired by the data communication is reproduced, presence/absence of reproduction authority may be confirmed by referring to the current time.

Accordingly, it is preferred that the time indicated by the internal clock is correct. On the other hand, depending on a use situation of the radio communication apparatus, a deviation may be occurred between the time of the internal clock and the actual current time. For example, if the internal clock is less accurate, the deviation gradually becomes larger. If a user with the radio communication apparatus travels for a long distance, the time of the internal clock may be deviated from the destination local time because of the time difference.

To solve the above-described problem, there is a method that is to be executed by a radio communication apparatus for correcting the time of the internal clock by acquiring time information from the radio access network. For example, there is a system in which a mobile terminal requests a base station to transmit time information and the base station transmits the time information in response to the request from the mobile terminal (see, for example, Japanese Laid-open patent publication No. 2002-156478). Furthermore, there is a technique in which, in a region in which an Advanced Mobil Phone Service (AMPC) system that does not broadcast the time information and a Code Division Multiple Access (CDMA) system broadcasts the time information exist together, a mobile phone terminal device adds the CDMA system to receive the time information and then switches the connection destination to the AMPC system (see, for example, Japanese Laid-open patent publication No. 11-136755).

As described above, there are two types of radio access networks: one radio access network provides the time information and the other radio access network does not provide the time information. Accordingly, the technique described in Japanese Laid-open patent publication No. 2002-156478 is unable to correct the time in a case of using the radio access network that does not provide the time information.

As for the radio access networks with the same communication method, some radio access networks provide the time information and some radio access networks do not provide the time information. For example, in Wideband CDMA (W-CDMA), a system that provides the time information and the other system that does not provide the time information are mixed. Therefore, even the technique described in Japanese Laid-open patent publication No. 11-136755, may fail to perform time correction.

SUMMARY

A radio communication apparatus includes: a radio communication unit which searches a connectable radio access network to be connected to at least one radio access network and receives broadcast information of the connected radio access network, and a control unit which connects the radio access network to the first radio access network detected by the search, checks whether or not the broadcast information includes time information, and connects the radio communication unit to a second radio access network detected by the search if the broadcast information does not include the time information.

The object and advantages of the various embodiments will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 6 is a diagram illustrating a data structure example of a network information table.

DESCRIPTION OF THE EMBODIMENTS

With reference to the diagrams, detailed description will be made below of the present embodiment.

Figure 1:
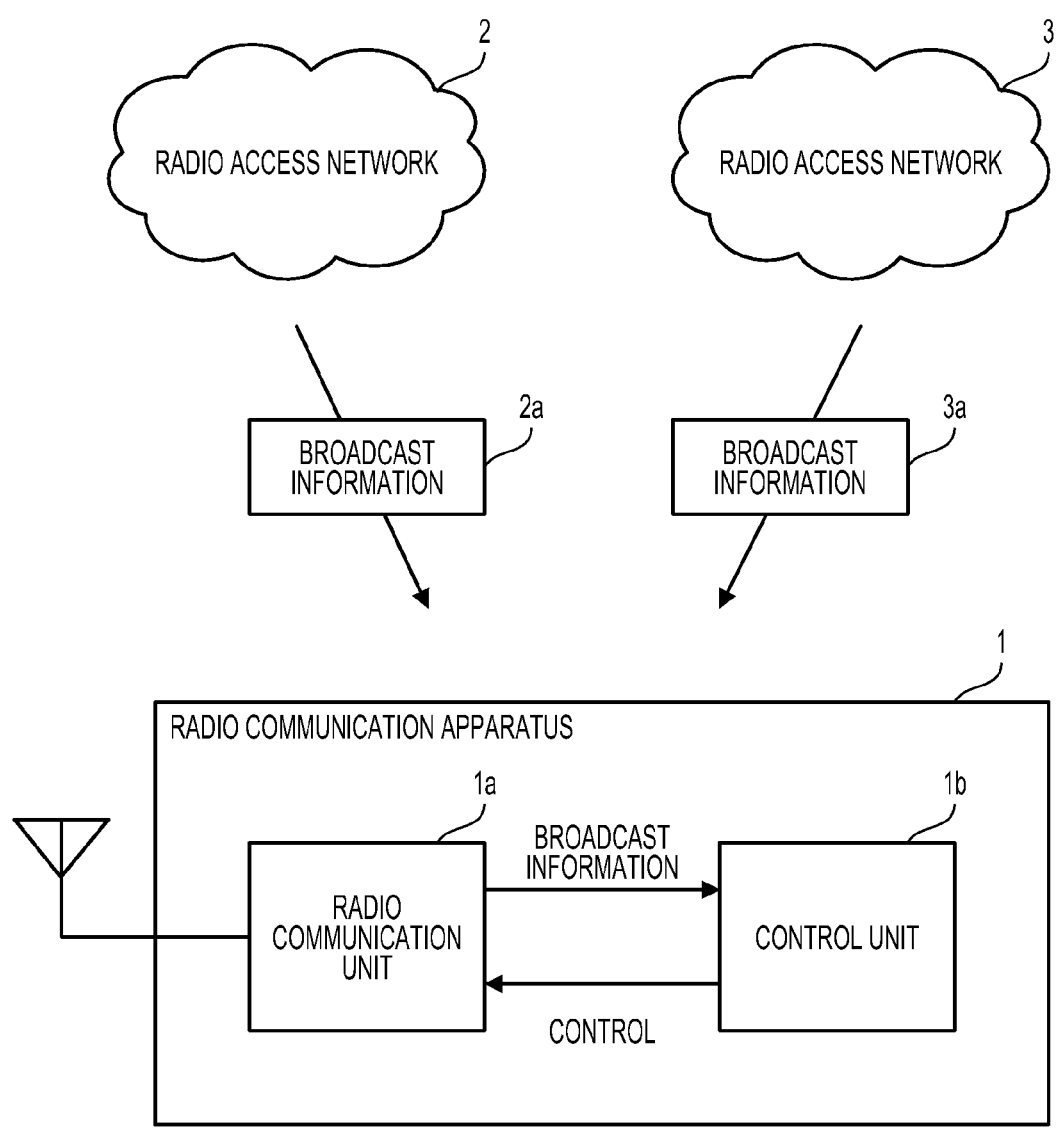
FIG. 1 is a diagram illustrating an example of a radio communication apparatus.

FIG. 1 is a diagram illustrating an example of a radio communication apparatus. A radio communication apparatus 1, which is connectable to radio access networks 2 and 3, is, for example, a mobile station such as, a mobile phone. The radio access network 2 broadcasts broadcast information 2a. The radio access network 3 broadcasts broadcast information 3a. The broadcast information 2a and 3a may include time information. The radio communication apparatus 1 includes a radio communication unit 1a and a control unit 1b.

The radio communication unit 1a searches a connectable radio access network based on a reception situation of radio signals. A search is performed, for example, when the power supply of the radio communication apparatus 1 is turned on. After that, the search may be continuously performed. In this case, the radio access networks 2 and 3 are detected by the search. Based on the control of the control unit 1b, the radio communication unit 1a performs connection and disconnection with the radio access networks 2 and 3. The radio communication unit 1a is able to receive the broadcast information 2a while being connected to the radio access network 2. In the same manner, the radio communication unit 1a is able to receive the broadcast information 3a while being connected to the radio access network 3.

The control unit 1b controls processing of connection and disconnection of the radio communication unit 1a by considering whether or not the time information is acquired. For example, the control unit 1b firstly selects the radio access network 2 as a connection destination (a first radio access network). The control unit 1b checks whether or not the broadcast information 2a received by the radio communication unit 1a includes the time information. If the time information is not included, the control unit 1b selects the radio access network 3 as a next connection destination (a second radio access network). The control unit 1b checks whether or not the broadcast information 3a received by the radio communication unit 1a includes the time information.

In this manner, if at least either the detected radio access network 2 or 3 provides the broadcast information that includes the time information, the control unit 1b may acquire the time information. The time information is used, for example, to correct the time of the internal clock provided in the radio communication apparatus 1. After acquiring the time information, the control unit 1b may switch the connection to a radio access network used for voice communication and data communication. On the other hand, if neither the radio access network 2 nor 3 provides the broadcast information that includes the time information, the user may be required to input the current time. Until the time information is successfully acquired, the search of the radio access network and the check of presence/absence of the time information may be continued.

In this case, the communication methods of the radio access network 2 and the radio access network 3 may be the same or may be different. The communication method may be, for example, Global System for Mobile communications (GSM), General Packet Radio Service (GPRS), Personal Digital Cellular (PDC), W-CDMA, or CDMA 2000. The radio communication unit 1a may include a plurality of circuits of radio signal processing to correspond to a plurality of communication methods. When the radio communication unit 1a is connected to the radio access network 3 after being connected to the radio access network 2, the connection to the radio access network 2 may be maintained or may be disconnected.

The control unit 1b may select either the radio access network 2 or the radio access network 3 (as the first radio access network) detected by the search to connect preferentially. For example, the control unit 1b learns a communication method with a higher possibility of acquiring the time information based on the acquired result of the past time information, and then selects a radio access network of the communication method with the higher possibility of acquiring. The learning of possibility of acquiring may be performed on each area (e.g., each country).

Preferably, the time information broadcast by the radio access networks 2 and 3 is information by which the radio communication apparatus 1 recognizes the current time. Therefore, the time information may display the current time of an area where the radio access networks 2 and 3 are located or may display the world standard time. Furthermore, the time information may indicate a difference between the current time and other time that the radio communication apparatus 1 may recognize.

According to the above-described radio communication apparatus 1, the radio communication unit 1a searches a connectable radio access network. The control unit 1b controls the radio communication unit 1a to be connected to the radio access network 2 detected by the search. The radio communication unit 1a receives the broadcast information 2a of the radio access network 2. The control unit 1b checks whether or not the broadcast information 2a includes the time information. If no, the control unit 1b controls the radio communication unit 1a so that the radio communication unit 1a is connected to the radio access network 3 detected by the search. The radio communication unit 1a receives the broadcast information 3a of the radio access network 3.

Accordingly, the radio communication apparatus 1 may flexibly acquire the time information from the radio access networks 2 and 3. That is, even if the radio communication apparatus 1 does not recognize which radio access network broadcasts the time information, the radio communication apparatus 1 may acquire the time information only if the time information is broadcast by at least either the radio access network 2 or 3 detected by the search. As a result, for example, the time of the internal clock in the radio communication apparatus 1 may be automatically corrected. By learning a communication method with a high possibility of acquiring the time information, the time required to acquire the time information may be shortened. In particular, by performing the learning on each country, appropriate determination may be made in consideration of characteristics of the radio access network of each country.

Description will be made below of an example of a case where the above-described radio communication method of the radio communication apparatus 1 is used for a mobile station of the mobile communication system. The above-described radio communication method may be used for various radio communication apparatuses except the mobile station. Description will be made below of a mobile station (i.e., a so-called dual mode mobile terminal device) corresponding to the GSM and the W-CDMA.

Figure 2:
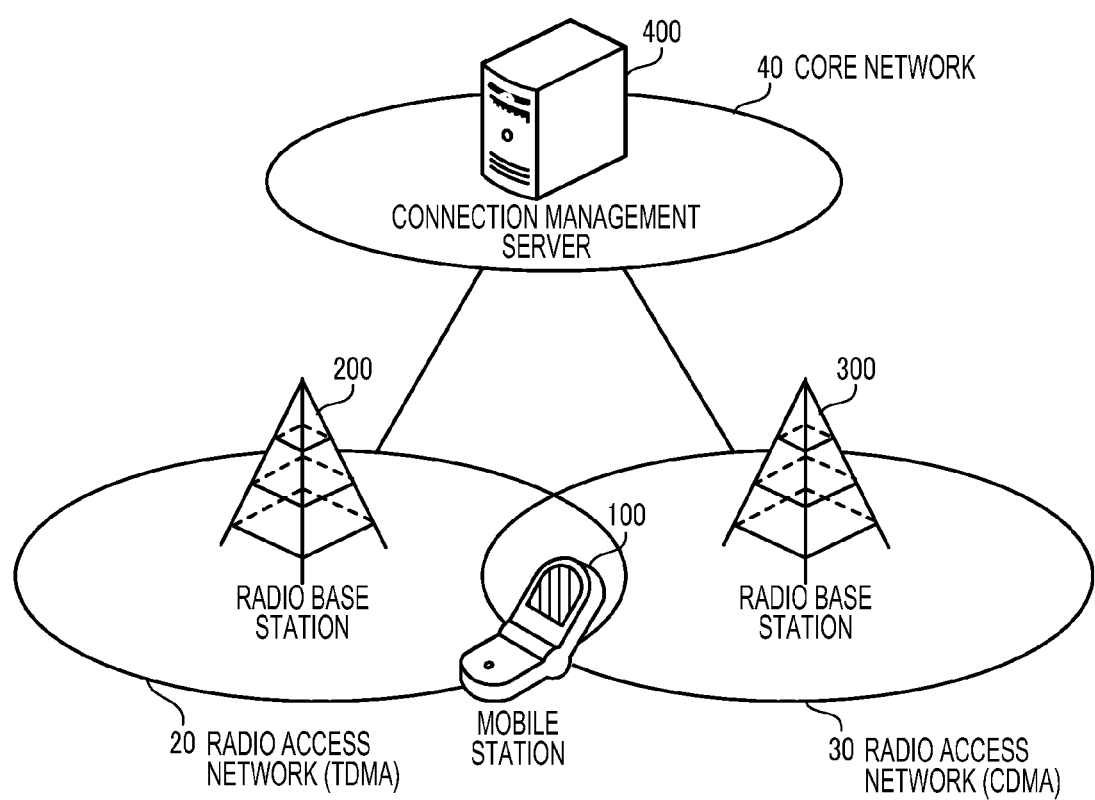
FIG. 2 is a diagram illustrating an entire configuration of a mobile communication system.

FIG. 2 is a diagram illustrating an entire configuration of the mobile communication system. This mobile communication system includes a radio access networks 20 and 30, a core network 40, a mobile station 100, radio base stations 200 and 300, and a connection management server 400. The radio access networks 20 and 30 are connected to the core network 40, respectively.

The radio access network 20 provides the mobile station 100 with a radio connection service. The radio access network 20 employs the GSM, a so-called second generation (2G) mobile phone method, as a radio communication method. That is, Time Division Multiple Access (TDMA) is used as a multi-connection method. The radio access network 20 includes a plurality of radio base stations that include the radio base station 200.

The radio access network 30 provides the mobile station 100 with the radio connection service. The radio access network 30 employs the W-CDMA, a so-called third generation (3G) mobile phone method, as a radio communication method. That is, the radio access network 30 employs the CDMA as a multiple-connection method. The radio access network 30 includes a plurality of radio base stations that include the radio base station 300.

The core network 40 is a wired network that controls traffic and relays user data transmitted and received by the mobile station 100. The core network 40 includes, for example, a line switching unit that processes a line switching call or a packet switching unit (not illustrated) that processes a packet switching call. The core network 40 includes the connection management server 400.

The mobile station 100 is a radio terminal device that is able to perform radio communication by the TDMA method and the CDMA method. That is, the mobile station 100 is connectable to the radio access network 20 according to the TDMA method and is connectable to the radio access network 30 according to the CDMA method. Furthermore, the mobile station 100 includes the internal clock and manages the current time. Description will be made below of a case where the mobile station 100 selects one of the radio access networks to connect. The mobile station 100 may be connected to a plurality of radio access networks at the same time.

The radio base station 200 is a radio communication apparatus that performs radio communication by the TDMA method. The radio base station 200 sets a radio link to the mobile station 100 to relay the user data between the mobile station 100 and the core network 40. The radio base station 200 broadcasts the broadcast information in a cell thereof.

The radio base station 300 is a radio communication apparatus that performs radio communication by the CDMA method. The radio base station 300 sets a radio link to the mobile station 100 to relay the user data between the mobile station 100 and the core network 40. The radio base station 300 broadcasts the broadcast information in a cell thereof.

In this case, the broadcast information, which is broadcast by the radio base stations (that include the radio base station 200) belonging to the radio access network 20, includes the time information. The broadcast information, which is broadcast by the radio base stations (that include the radio base station 300) belonging to the radio access network 30, does not include the time information. The presence/absence of the time information is not determined uniquely depending on the communication method (the GSM or the W-CDMA).

The connection management server 400 controls setting and disconnection with respect to the mobile station 100. When the mobile station 100 is connected to the radio access networks 20 and 30, the connection management server 400 authenticates the mobile station 100 and registers the current position of the mobile station 100 if the authentication is successful. When the mobile station 100 disconnects the connection to the radio access networks 20 and 30, the connection management server 400 deletes the registration of the mobile station 100.

The mobile station 100 may further be connected to a radio access network of another radio communication method. For example, the mobile station 100 may perform the radio communication by Orthogonal Frequency Division Multiple Access (OFDMA). The radio access networks 20, 30 and the core network 40 may be managed by the same communication provider or different communication providers, respectively.

Figure 3:
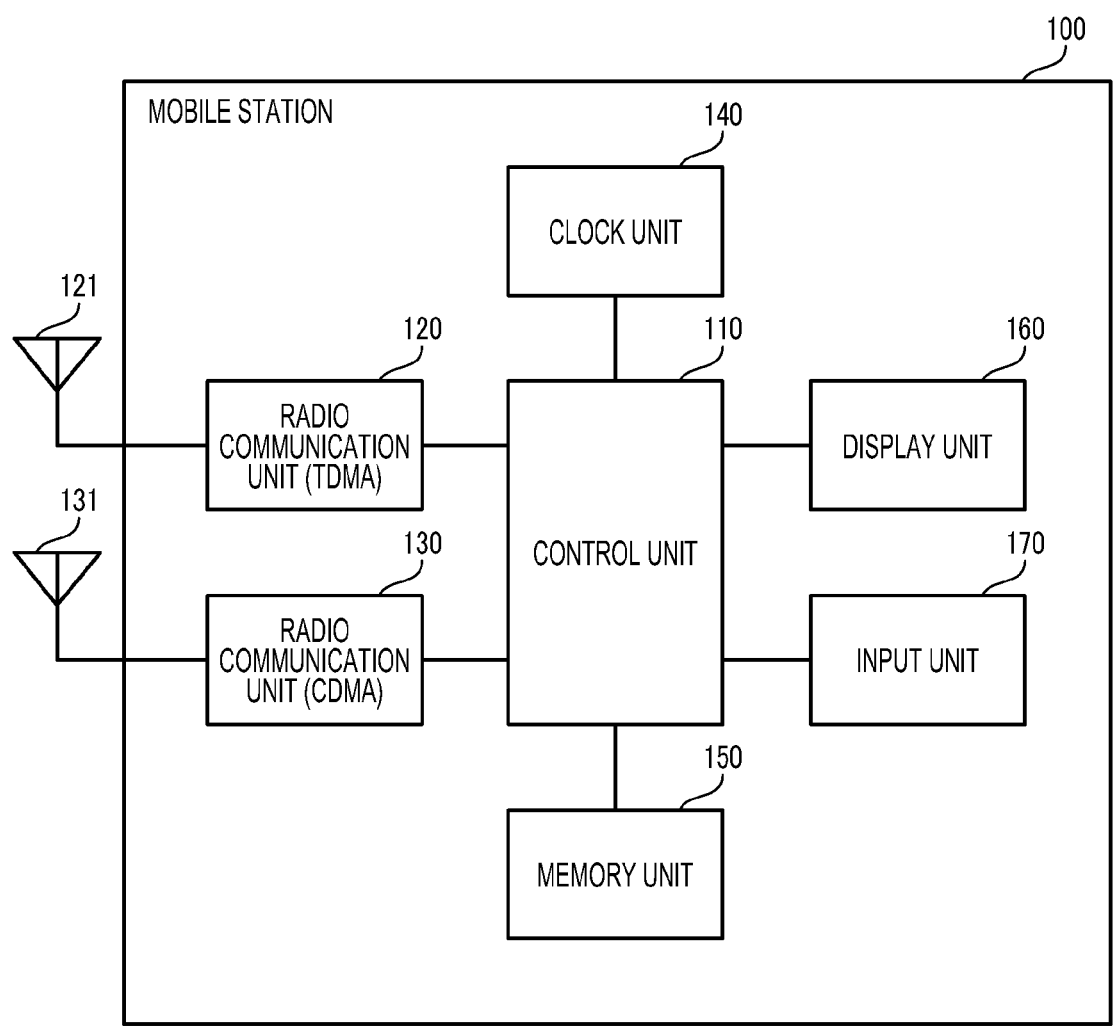
FIG. 3 is a block diagram illustrating a mobile station.

FIG. 3 is a block diagram illustrating a mobile station. The mobile station 100 includes a control unit 110, radio communication units 120 and 130, a clock unit 140, a memory unit 150, a display unit 160, and an input unit 170. The radio communication units 120 and 130 correspond to the radio communication unit 1a illustrated in FIG. 1. The control unit 110 corresponds to the control unit 1b illustrated in FIG. 1.

The control unit 110 performs various control such as communication control or input/output control related to operations of the mobile station 100. For example, the control unit 110 makes the radio communication units 120 and 130 search the connectable radio access network to select a connection destination based on a search result. According to the input from the input unit 170, the time managed by the clock unit 140 and the data stored by the memory unit 150 are displayed on the display unit 160. The control unit 110 corrects the time managed by the clock unit 140 based on the time information received by the radio communication units 120 and 130 or on the input from the input unit 170.

The control unit 110 may be realized by using a Central Processing Unit (CPU) and a Random Access Memory (RAM). The CPU executes programs of the communication control and the input/output control. The RAM temporarily stores at least some of the data used for the programs and the processing executed by the CPU. Instead of the RAM, another type of memory may be used.

Based on the control of the control unit 110, the radio communication units 120 and 130 search the connectable radio access network and establish a connection to perform radio communication. The radio communication unit 120 may be connected to the radio access network 20 of the GSM method by using an antenna 121. The radio communication unit 130 may be connected to the radio access network 30 of the W-CDMA method by using an antenna 131. The radio communication unit 120 and the radio communication unit 130 may share a common antenna. The radio communication units 120 and 130 output the received user data or broadcast information to the control unit 110.

The clock unit 140 manages the time. After acquiring the information indicating the current time from the control unit 110 after the mobile station 100 is turned on, the clock unit 140 sets the internal clock and starts counting the time. After that, when the control unit 110 sends an instruction of time correction, the clock unit 140 corrects the internal clock. According to a request from the control unit 110, the clock unit 140 broadcasts the time to the control unit 110.

The memory unit 150 is a nonvolatile memory that stores programs and data used by the control unit 110. For example, the memory unit 150 stores programs of the communication control or the input/output control. The memory unit 150 further stores content data such as music data and image data. Some of the content data have a use restriction by DRM. When the content data with the use restriction is reproduced, the current time is referred to check the presence/absence of the authority. The memory unit 150 further stores information displaying a result indicating the possibility of acquiring the time information.

The display unit 160 displays various images based on the control of the control unit 110. A liquid crystal display or an organic Electro Luminescence (EL), for example, may be used as the display unit 160. The contents of the images displayed on the display unit 160 may be an operation screen, a text document, a still image content, or a moving image content.

The input unit 170 accepts an input operation by the user and broadcasts a content of the input operation to the control unit 110. A keypad, for example, may be used as the input unit 170. The keypad is provided with various keys such as a numerical keypad, arrow keys, and function keys. In this case, the input unit 170 outputs a signal indicating a key that is pressed by the user to the control unit 110. The user may perform various setting such as communication operation setting and time setting by using the input unit 170.

Figure 4:
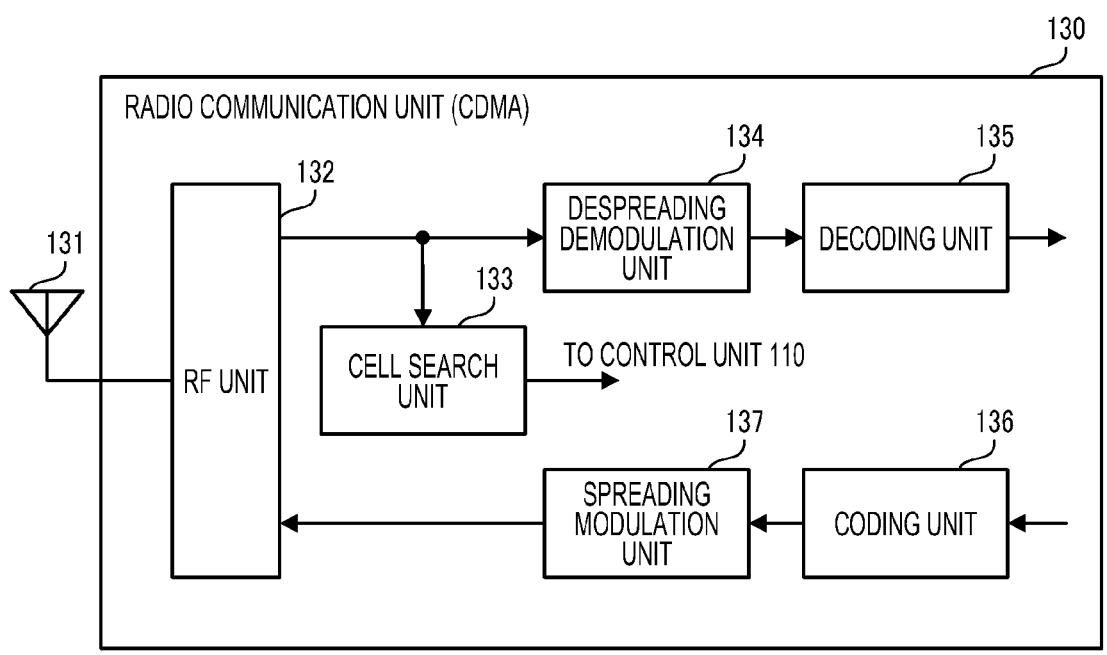
FIG. 4 is a block diagram illustrating details of a radio communication unit.

FIG. 4 is a block diagram illustrating details of the radio communication unit. The radio communication unit 130 includes an RF unit 132, a cell search unit 133, a despreading demodulation unit 134, a decoding unit 135, a coding unit 136, and a spreading modulation unit 137.

The RF unit 132 performs radio signal processing. The RF unit 132 converts a radio signal received by the antenna 131 into a baseband signal and then outputs the baseband signal to the cell search unit 133 and to the despreading demodulation unit 134. The RF unit 132 converts the baseband signal received from the spreading modulation unit 137 into a radio signal and then outputs the radio signal to the antenna 131. The RF unit 132 includes an amplifier, a frequency convertor, a band pass filter, an AD convertor, a DA convertor, and a quadrature modulation and demodulation unit. A reception antenna and a transmission antenna may be provided separately.

The cell search unit 133 performs search and cell search of the radio access network based on the baseband signal acquired from the RF unit 132. That is, the cell search unit 133 performs despreading on the acquired signal by using each candidate of spreading codes. Then the cell search unit 133 detects a connectable radio access network and a cell based on a correlation value acquired by the dispreading. The cell search unit 133 broadcasts a search result to the control unit 110.

The despreading demodulation unit 134 performs dispreading on the baseband signal acquired from the RF unit 132 by using a given spreading code or a spreading code that is specified by a radio base station 300. The despreading demodulation unit 134 detects a symbol of each path and performs RAKE composition on the symbol at the same phase. The despreading demodulation unit 134 outputs a demodulated signal after the RAKE composition to the decoding unit 135.

The decoding unit 135 performs error correction decoding on the demodulated signal acquired from the despreading demodulation unit 134 according to a given decoding method or a decoding method that is specified by the radio base station 300. The decoding unit 135 detects and outputs the user data and the broadcast information to the control unit 110.

The coding unit 136 corrects and encodes the user acquired from the control unit 110 according to the given coding method or the coding method that is specified by the radio base station 300. Then the coding unit 136 outputs the coding signal to the spreading modulation unit 137.

The spreading modulation unit 137 performs spreading on the coding signal, acquired from the coding unit 136, by using a given spreading code or a spreading code that is specified by the radio base station 300. The spreading modulation unit 137 outputs the baseband signal after the spreading to the RF unit 132.

As with the radio communication unit 130, the radio communication unit 120 includes functions such as radio signal processing, cell search, modulation, coding, demodulation, and decoding. The radio communication unit 130 performs processing according to the CDMA method. In other hand, the radio communication unit 120 performs processing according to the TDMA method.

Figure 5:
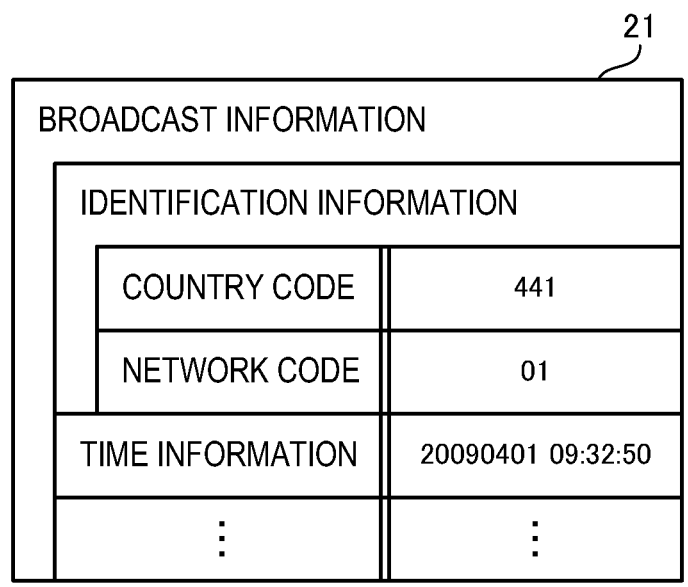
FIG. 5 is a diagram illustrating a data structure example of broadcast information.

FIG. 5 is a diagram illustrating a data structure example of broadcast information. The broadcast information 21 is broadcast by the radio access network 20. For example, the radio base station 200 transmits the broadcast information entirely in the cell thereof. The broadcast information 21 includes identification information and time information.

The identification information specifies the radio access network 20. The identification information includes a country code and a network code. A country code is a three-digit number indicating a country or a region. A network number is a two-digit number that is uniquely allocated for each radio access network (or each communication provider). By combining a country code and a network number, each radio access network may be uniquely specified. As identification information, characters other than numbers may be used.

The time information indicates the current date, month, year and the current second, minute, and hour. The current time indicated by the time information may be the world standard time or the local time of the location in which the radio access network 20 is located. The time information may include information of a time difference between the world standard time and the current local time. The mobile station 100 is able to specify the time difference according to a country code.

As with the broadcast information 21, the broadcast information that includes the identification information is broadcast in the radio access network 30. The broadcast information of the radio access network 30 does not include the time information. The radio base stations 200 and 300 transmit the broadcast information regularly, for example. The radio base stations 200 and 300 may transmit the broadcast information irregularly (e.g., when any of the base station is newly connected to the radio base stations 200 and 300).

FIG. 6 is a diagram illustrating a data structure example of a network information table. A network information table 151 is stored in the memory unit 150 of the mobile station 100. The network information table 151 includes items indicating a country code, a network code, a type, and time information.

A country code included in the broadcast information, that is, a three-digit number indicating a country or a region is set to the item of country code. A network number included in the broadcast information, that is, a two-digit number allocated to each radio access network (or a communication provider) is set to the item of network code. In FIG. 6, the two-digit number is indicated as "XX," or the like. A communication method (e.g., the GSM or the W-CDMA) is set to the item of type. A check result of the time information is set to the item of time information. For example, the result "OK" is set if the time information is acquired, and the result "NG" is set if the time information is not acquired.

The network information table 151 is updated by the control unit 110. For example, when the radio communication unit 130 is connected to the radio access network with the country code "466" and the network code "ZZ," and the control unit 110 conforms that the broadcast information does not include the time information. Information such as the country code "466," the network code "ZZ," the type "W-CDMA," and the time information "NG" are registered in the network information table 151. As described above, the mobile station 100 learns whether or not the time information is able to be acquired every time the mobile station 100 is connected to the radio access network.

As for the same radio access network, the past result and the latest result of the check may be different (e.g., the previous result is "NG" and the result is "OK" at this time). In this case, the acquired learning result is corrected, and the latest result of the check is reflected. For example, the item of time information in the network information table 151 is overwritten (e.g., the result "NG" is changed to "OK"). Alternatively, a possibility of acquiring may be calculated where the number of times of the check is the denominator and the number of times of the successful acquisition of the time information is the numerator. Consequently, the setting change of the radio access network may be flexibly performed.

Figure 7:
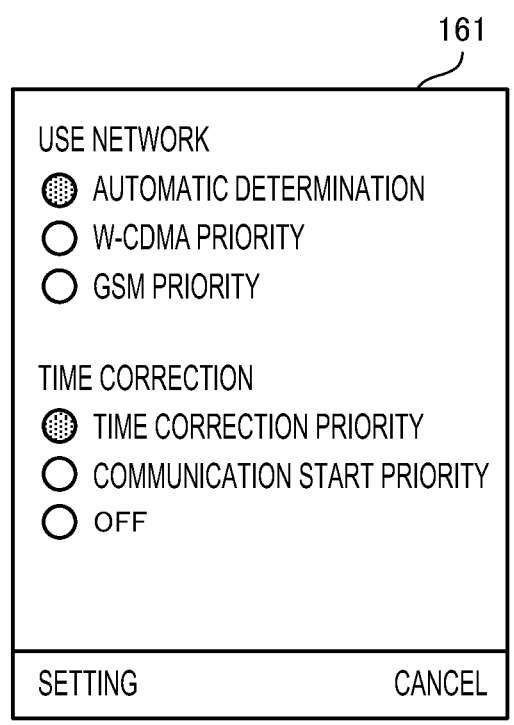
FIG. 7 is a diagram illustrating an example of a setting screen.

FIG. 7 is a diagram illustrating an example of a setting screen. The setting screen 161 is displayed on the display unit 160 of the mobile station 100. By operating the input unit 170 while the setting display 161 is being displayed, the user may change the operations of the mobile station 100. The setting screen 161 includes an item of use network and an item of time correction as setting items.

As for the item of use network, when a plurality of radio access networks are detected by the search, a determining method of determining which radio access network is used to transmit and receive user data is set. The user selects one of the following methods: a) Automatic Determination, b) W-CDMA Priority, and c) GSM Priority. The method of a) Automatic Determination is a method of selecting by which a radio access network with the best communication quality. The method of b) W-CDMA Priority is a method of preferentially selecting a radio access network that is connectable to the radio communication unit 130. The method of c) GSM Priority is a method of preferentially selecting a radio access network that is connectable to the radio communication unit 120.

As for the item of time correction, a method of automatically correcting the time managed by the clock unit 140 based on the time information. The user selects one of the following methods: a) Time Correction Priority, b) Communication Start Priority, and c) OFF. The method of a) Time Correction Priority is a method of receiving the time information and preferentially performing automatic correction on the time information. If the radio access network that is being connected does not broadcast the time information, the connection destination is temporally switched, and the user attempts to acquire the time information from another radio access network. The method of b) Communication Start Priority is a method of performing automatic correction only if the radio access network that is being connected broadcasts the time information. The method of c) OFF is a method of not performing automatic correction.

The control unit 110 may change the selection item on the setting screen 161 according to a search result of the radio access network or a check result of the time information. For example, if the radio access network of the W-CDMA method is not detected, "W-CDMA Priority" may be unselectable until another radio access network is detected. If the control unit 110 confirms that the time information is not broadcast in any of the detected radio access networks, "Time Correction Priority" may be unselectable until another radio access network is detected.

Figure 8:
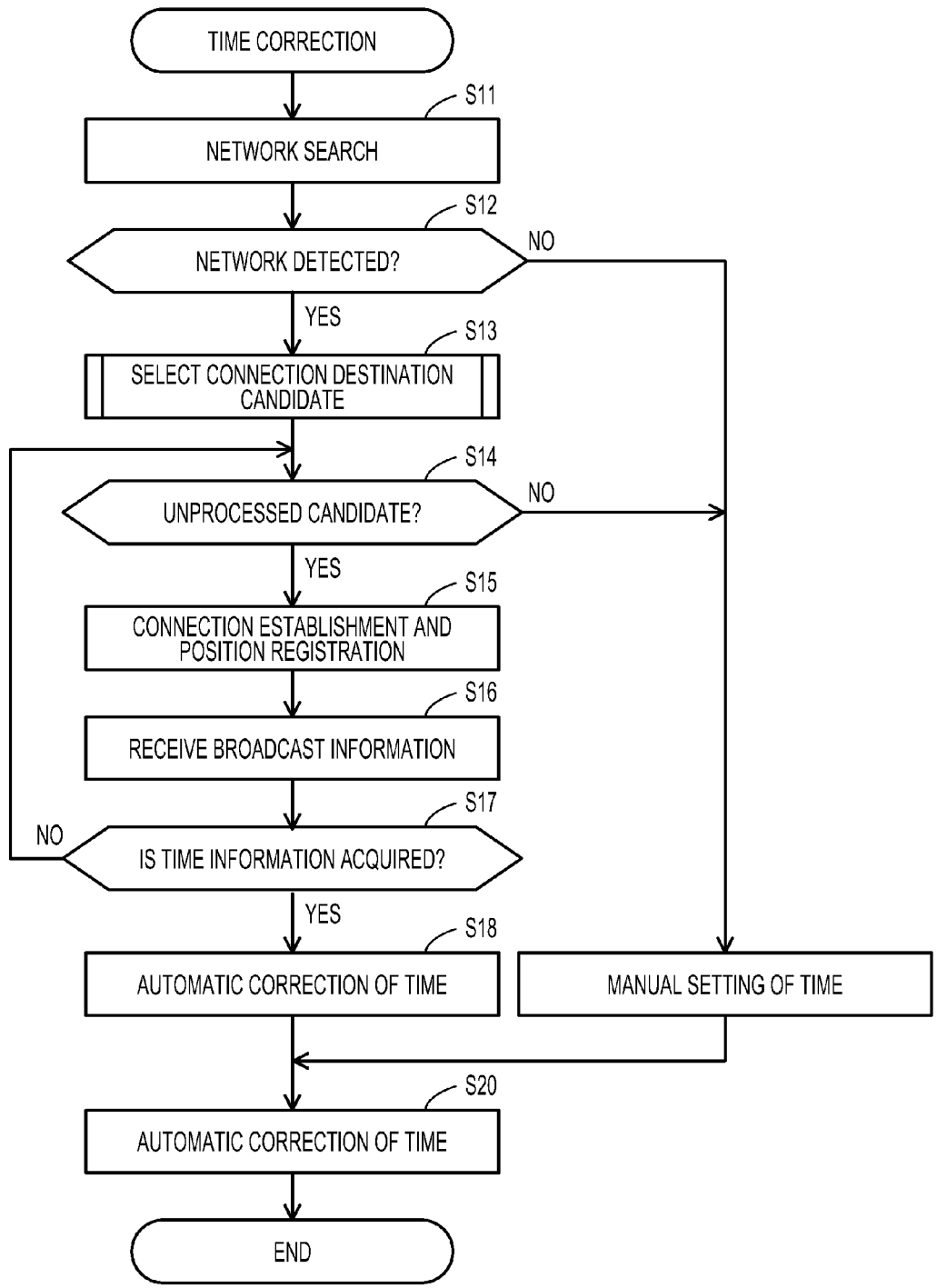
FIG. 8 is a flowchart illustrating a procedure of time correction.

FIG. 8 is a flowchart illustrating a procedure of time correction. The processing illustrated in FIG. 8 is repeatedly performed by the mobile station 100. For example, the processing is automatically performed when the mobile station 100 is turned on. After that, the processing is performed regularly or performed when an instruction is given by the user. Detailed description will be made of processing of time correction according to the operation numbers of the flowchart.

[Operation S11]

The control unit 110 instructs the radio communication units 120 and 130 to perform network search. The radio communication unit 120 searched the radio access network of the GSM method, and the radio communication unit 130 searches the radio access network of the W-CDMA method. The radio communication units 120 and 130 broadcast the search result to the control unit 110. The radio communication units 120 and 130 may perform the search sequentially or may perform the search in parallel.

[Operation S12]

The control unit 110 determines whether or not one or more radio access networks are detected based on the search result in Operation S11. If yes, the process goes to Operation S13. If no, the process goes to Operation S19.

[Operation S13]

The control unit 110 selects one or more connection destinations candidates from the radio access network detected in Operation S11. When selecting a plurality of connection destination candidates, the control unit 110 determines a connection order and also determines one radio access network (use network) that is eventually used to transmit and receive the user data. Detailed description will be made below of the selecting method of connection destination candidates.

[Operation S14]

From among the connection destination candidates selected in Operation S13, the control unit 110 determines whether or not each connection destination candidate selected in Operation S13 is unprocessed, that is, whether or not each connection destination candidate is subjected to the processing of Operations S15 and S16. If there is an unprocessed connection destination candidate, the process goes to Operation S15. If there is no unprocessed connection destination candidate, the process goes to Operation S19.

[Operation S15]

The control unit 110 selects one connection destination candidate with the highest priority from among the unprocessed connection destination candidates and then instructs the radio communication unit 120 or the radio communication unit 130 to connect with the selected connection destination candidate. The radio communication unit 120 or the radio communication unit 130 performs a procedure of connection establishment. In the connection establishment, a control message is transmitted to the core network 40 via the radio access network at the connection destination, and authentication and position registration of the mobile station 100 are performed by the connection management server 400.

If the radio connection unit 120 or the radio connection unit 130 has already been connected to any of the radio access networks, the radio connection unit 120 or the radio connection unit 130 sets a new connection after disconnecting the current connection. When the connection is disconnected, a control message is transmitted to the core network 40 via the radio access network that is being connected, and the registration release of the mobile station 100 is performed by the connection management server 400.

[Operation S16]

The radio communication unit 120 or the radio communication unit 130 receives broadcast information of the radio access network that is connected in Operation S15. The control unit 110 checks whether or not the acquired broadcast information includes the time information. If yes, the time information is detected. The country code and the network code are specified based on the acquired broadcast information. The check result of the time information, the country code, the network code, and the type of communication are registered in the network information table 151 stored in the memory unit 150.

[Operation S17]

The control unit 110 determines whether or not the time information is able to be acquired in Operation S16, that is, whether or not the broadcast information includes the time information. If yes, the process goes to Operation S18. If no, the process goes to Operation S14.

[Operation S18]

The control unit 110 uses the time information acquired in Operation S16 to correct the time managed by the clock unit 140. For example, the current time indicated by the time information is set to the clock unit 140. After that, the process goes to Operation S20.

[Operation S19]

The control unit 110 determines that the time information may not be acquired from any of the radio access networks and then prompts the user to input the current time. That is, the operation screen for inputting the current time is displayed on the display unit 160. After that, when the user inputs the time using the input unit 170, the control unit 110 sets the input time to the clock unit 140.

[Operation S20]

The control unit 110 controls the radio communication units 120 and 130 so that the radio access network at the connection destination is switched to the use network determined in Operation S13. Specifically, if the radio access network and the use network are the same, the current connection is maintained. On the other hand, if the radio access network and the use network are different, the connection to the use network is set after the current connection is disconnected.

In this manner, the mobile station 100 checks whether or not the connected radio access network broadcasts the time information. If no, the mobile station 100 is connected to another radio access network detected by the search. If yes, on the other hand, the time of the internal clock is corrected by using the acquired time information, and the connection destination is switched to the radio access network used to transmit and receive the user data. As described above, the user also may set in such a way that the mobile station 100 does not perform automatic correction of the time.

The mobile station 100 may authenticate and acquire the time information only when a prescribed period passes after the previous automatic correction. Furthermore, the above-described processing is repeatedly performed until the time information is successfully received after the manual setting of the time is performed by the user. This is because, in the DRM, the time by manual setting may not be used, so that the time by the automatic correction may be required.

Figure 9:
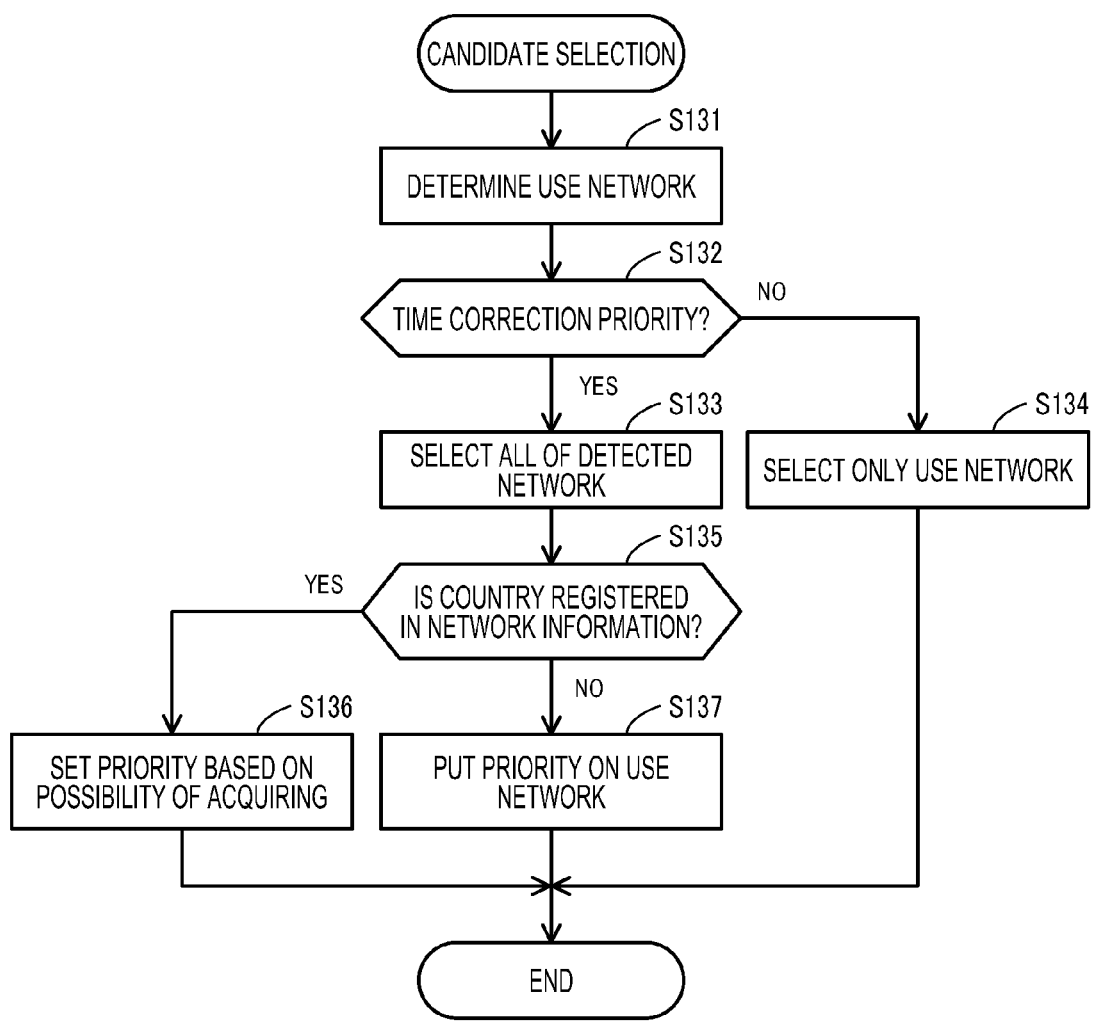
FIG. 9 is a flowchart illustrating a procedure of connection destination candidate selection.

FIG. 9 is a flowchart illustrating a procedure of connection destination candidate selection. The processing illustrated in FIG. 9 is performed in the above-described Operation S13. Detailed description will be made below of processing of the connection destination candidate selection according to the operation numbers.

[Operation S131]

The control unit 110 selects one of the radio access networks detected by the search in Operation S11 to use to transmit and receive the user data. The selecting method varies depending on the setting of the mobile station 100.

For example, in case of "Automatic Determination," the control unit 110 selects a radio access network with the best communication quality regardless of the communication method. In case of "W-CDMA Priority," if the radio access networks of the W-CDMA method are detected, the control unit 110 selects a radio access network from among the detected radio access networks of the W-CDMA method, and selects a radio access network from among other radio access networks if no radio access network of the W-CDMA method is detected. In case of "GSM Priority," if the radio access networks of the GSM method are detected, the control unit 110 selects a radio access network from among the detected radio access networks of the GSM method, and selects a radio access network from among other radio access networks if no radio access network of the GSM method is detected.

[Operation S132]

The control unit 110 determines whether or not the setting of time correction is "Time Correction Priority." If the setting is "Time Correction Priority," the process goes to Operation S133. If no, the process goes to Operation S134.

[Operation S133]

The control unit 110 selects all the radio access networks, detected by the search in Operation S11, as connection destination candidates. After that, the process goes to Operation S135. In this case, the control unit 110 may acquire the time information from the radio access network other than the use network.

[Operation S134]

The control unit 110 selects only the use network, determined in Operation S131, as a connection destination candidate. After that, the process goes to the above-described Operation S14. In this case, even if the use network does not broadcast the time information, the control unit 110 is not connected to another radio access network.

[Operation S135]

When the country or region in which the mobile station 100 is currently located is identified, the control unit 110 determines whether or not the information about the country or region in which the mobile station 100 is located is registered in the network information table 151 stored in the memory unit 150. If the above-described condition is met, the process goes to Operation S136. If the above-described condition is not met, the process goes to Operation S137. Shortly after the mobile station 100 is turned on, the current country or region may not be recognized in most cases because the mobile station 100 may have moved for a long distance while the mobile station 100 is being stopped.

[Operation S136]

The control unit 110 detects the information about the current country or region from the network information table 151 and determines the possibility of acquiring the time information of each communication method (e.g., the GSM or the W-CDMA). Based on the possibility of acquiring, a connection order of the radio access networks selected in Operation S133 is determined.

For example, a connection destination candidate of the communication method with a higher possibility of acquiring is set in a higher position in the order. If there are a plurality of connection destination candidates of the same communication method, the order may be determined in consideration of the communication quality. If the possibility of acquiring the use network is equal to or higher than a prescribed threshold value, the use network may be set to the first place. After that, the process goes to Operation S14.

[Operation S137]

The control unit 110 sets the use network to the first place. If there is a connection destination candidate other than the use network, the order below the second place is determined in further consideration of the communication quality. After that, the process goes to Operation S14.

In this manner, when the setting of time correction is "Time Correction Priority," the mobile station 100 may acquire the time information and automatically corrects the time if the time information is broadcast by any of the detected radio access networks. At this time, the mobile station 100 determines a connection order based on the past learning result. That is, the radio access network with the high possibility of acquiring the time information may be preferentially connected. This makes it possible to reduce overhead of the setting of the connection and the disconnection.

The description was made of the learning of the possibility of acquiring the time information of each country or region and each communication method. The control unit 110 may learn the possibility of acquiring for each communication method regardless of country or region.

Figure 10:
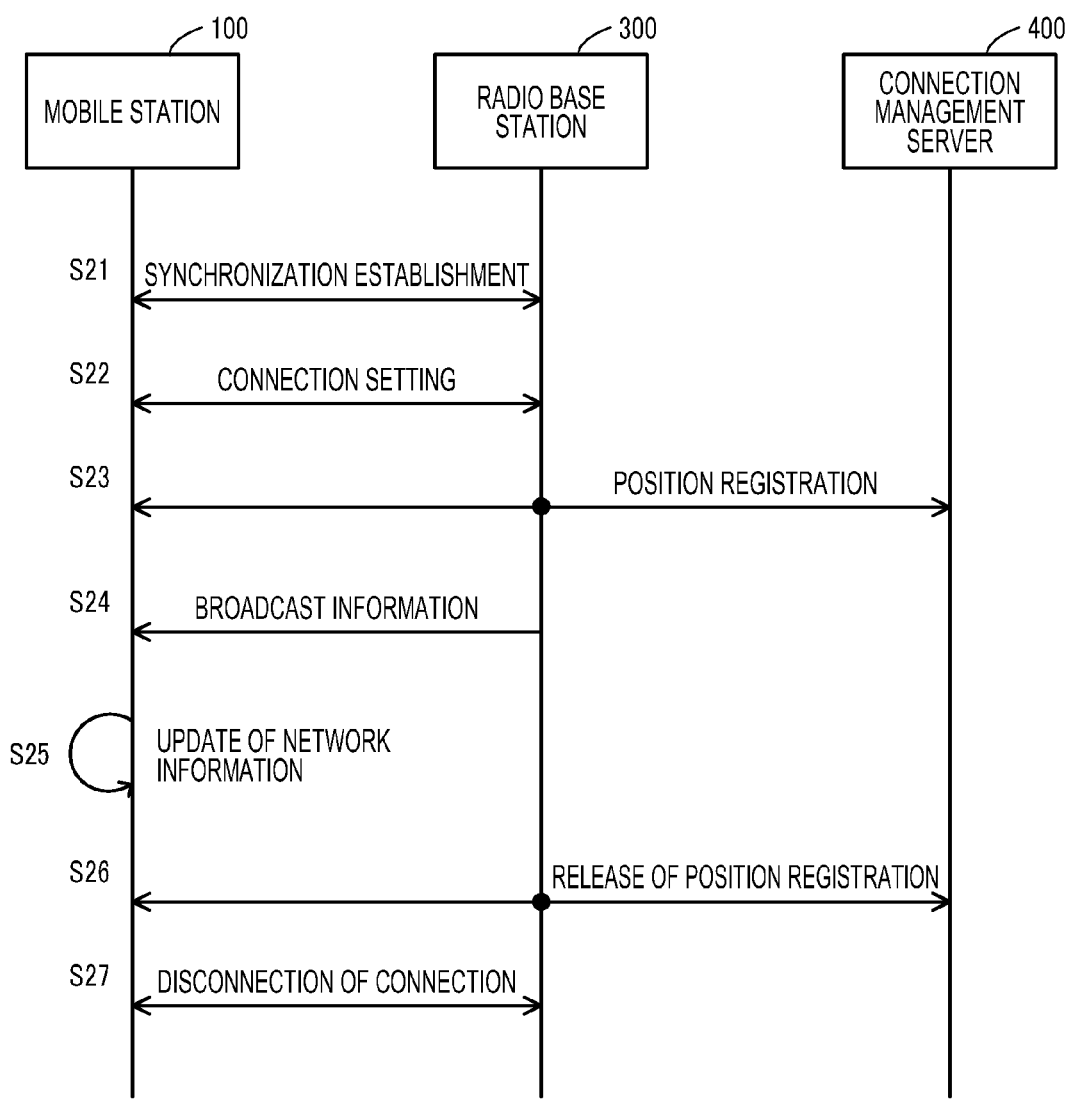
FIG. 10 is a sequence diagram illustrating a procedure of broadcast information reception.

FIG. 10 is a sequence diagram illustrating a procedure of broadcast information reception. In this case, description will be made of a case where the mobile station 100 performs radio communication with the radio base station 300 in the radio access network 30. Description will be made below of a flow of a message illustrated in FIG. 10 according to the operation numbers.

[Operation S21]
The mobile station 100 has synchronization of the radio signal with the radio base station 300.

[Operation S22]
The mobile station 100 requests the radio base station 300 to set a radio link. The radio base station 300 sets the radio link to be used to communicate with the mobile station 100 and broadcasts the setting completion to the mobile station 100. Accordingly, a connection is established between the mobile station 100 and the radio base station 300.

[Operation S23]
The mobile station 100 requests the connection management server 400 via the radio base station 300 to register the position thereof. The connection management server 400 authenticates the mobile station 100. If the authentication is successful, the current position of the mobile station 100 is registered in a database (not illustrated) in the core network 40. The connection management server 400 broadcasts completion of the position registration to the mobile station 100 via the radio base station 300.

[Operation S24]
The radio base station 300 transmits broadcast information. The mobile station 100 receives the broadcast information transmitted from the radio base station 300. At this time, the broadcast information to be received by the mobile station 100 may be regularly transmitted from the radio base station 300 or may be transmitted from the radio base station 300 at the time of connection and of position registration of the mobile station 100 as a trigger.

[Operation S25]
The mobile station 100 checks whether or not the broadcast information received in Operation S24 includes the time information. Then the check result is registered in the network information table 151.

[Operation S26]
The mobile station 100 requests the connection management server 400 via the radio base station 300 to perform the registration release thereof. The connection management server 400 deletes the registration information of the mobile station 100 from the database (not illustrated) in the core network 40.

The connection management server 400 broadcasts completion of the registration release to the mobile station 100 via the radio base station 300.

[Operation S27]
The mobile station 100 requests the radio base station 300 to release the radio link. The radio base station 300 releases the radio link used to communicate with the mobile station 100 and broadcasts the release completion to the mobile station 100. Accordingly, the connection between the mobile station 100 and the radio base station 300 is disconnected.

In this manner, when selecting the radio access network 30 as a connection destination, the mobile station 100 transmits and receives a control message, and performs procedures of connection establishment and position registration. Then the mobile station 100 receives the broadcast information of the radio access network 30 and checks whether or not the time information is broadcast. After that, the mobile station 100 transmits, receives the control message, and performs procedures of position registration release and disconnection.

Figure 11:
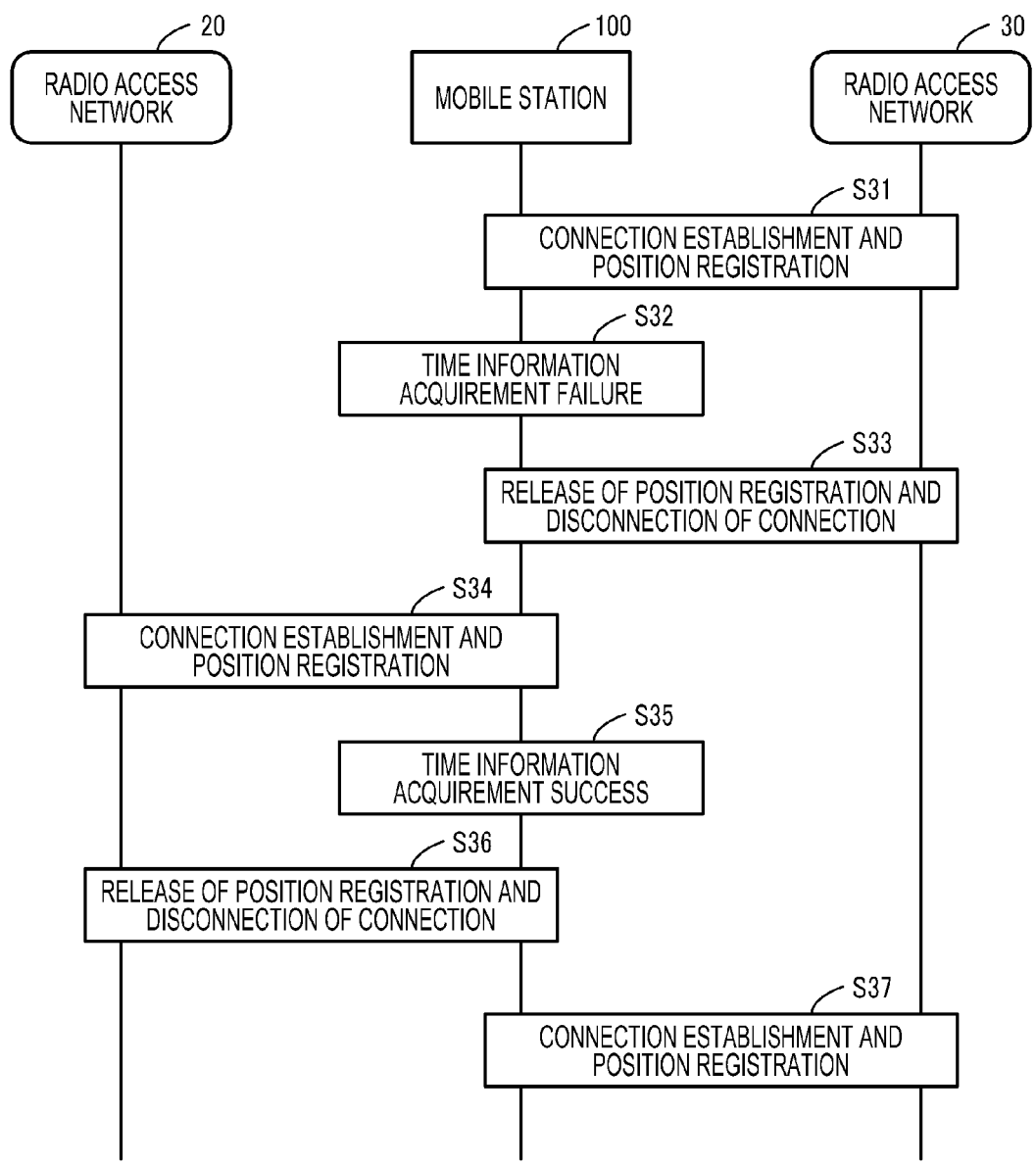
FIG. 11 is a sequence diagram illustrating an example of network switching.

FIG. 11 is a sequence diagram illustrating an example of network switching. In this case, description will be made of a case where the mobile station 100 has not learned the possibility of acquiring the time information yet and selects the radio access network 30 as a use network. Description will be made below of a flow of the processing illustrated in FIG. 11 according to the operation numbers. As described above, the radio access network 20 broadcasts the time information, and the radio access network 30 does not broadcast the time information.

[Operation S31]
The mobile station 100 selects the radio access network 30, a use network, as a connection destination. The mobile station 100 performs procedures of connection setting and position registration on the radio access network 30.

[Operation S32]
The mobile station 100 receives the broadcast information of the radio access network 30 and checks whether or not the broadcast information includes the time information. As a result, the mobile station 100 recognizes that the time information is not acquired.

[Operation S33]
The mobile station 100 performs procedures of the position registration release and the disconnection on the radio access network 30.

[Operation S34]
The mobile station 100 selects the radio access network 20 that is different from the use network as a next connection destination. The procedures of the connection setting and the position registration are performed on the radio access network 20.

[Operation S35]
The mobile station 100 receives the broadcast information of the radio access network 20 and checks whether or not the broadcast information includes the time information. As a result, the mobile station 100 recognizes that the time information is acquired.

[Operation S36]
Since the radio access network 20 that is being connected is not a use network, the mobile station 100 performs the procedures of the position registration release and the disconnection on the radio access network 20.

[Operation S37]
The mobile station 100 again selects the radio access network 30, a use network, as a connection destination. The procedures of the connection setting and the position registration are performed on the radio access network 30.

In this manner, if the mobile station 100 is unable to acquire the time information in the use network, the mobile station 100 is temporally connected to another radio access detected by the search to acquire the time information. After that, the mobile station 100 is again connected to the use network.

Figure 12:
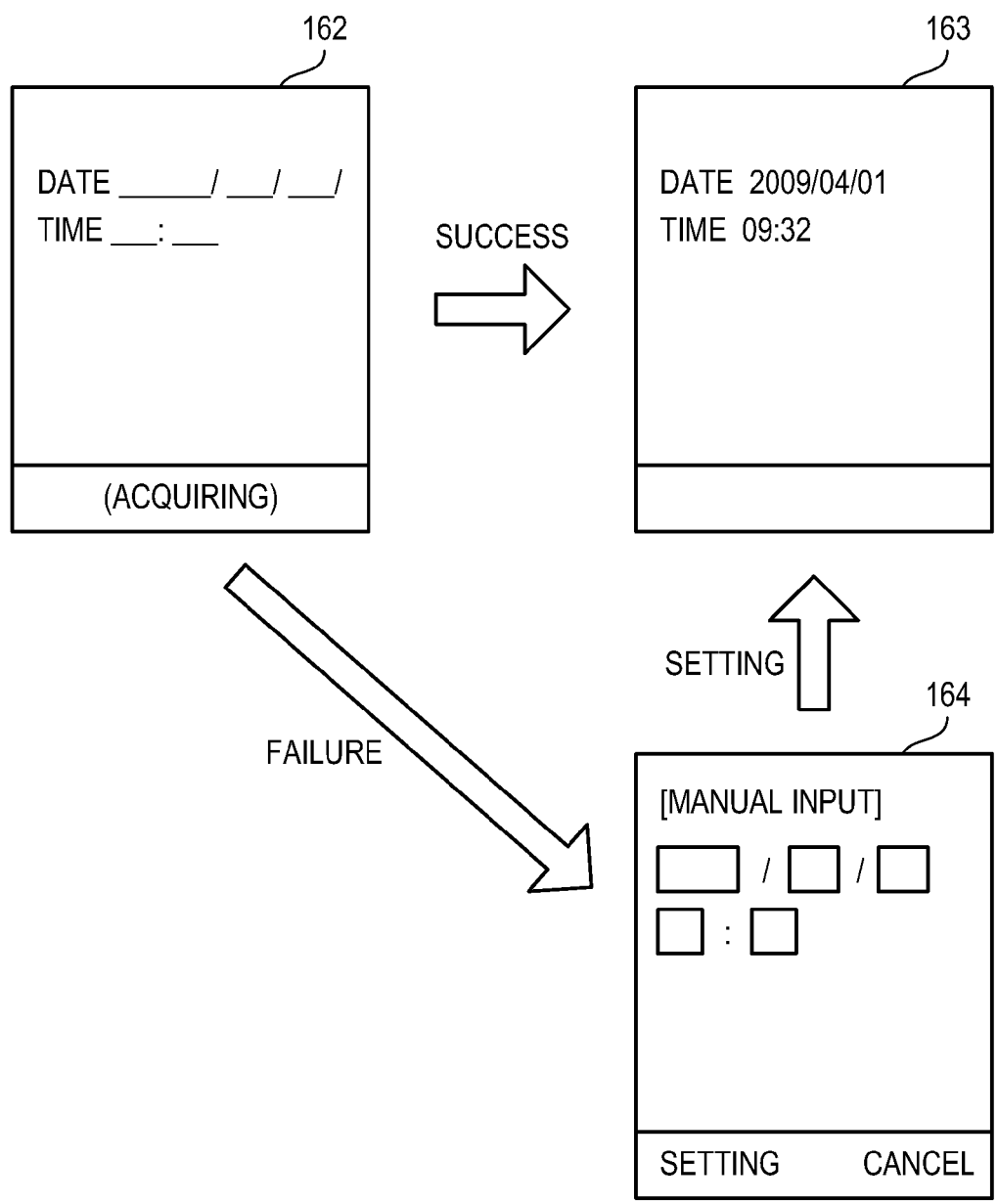
FIG. 12 is a diagram illustrating an example of change of a standby screen.

FIG. 12 is a diagram illustrating an example of change of a standby screen. When the mobile station 100 is turned on, the display unit 160 displays a standby screen 162. The standby screen 162 displays that the time of the internal clock is not set and that the time information is being acquired. That is, while the standby screen 162 is being displayed, the mobile station 100 performs the search of the radio access network, the connection, and the check of the time information.

If the mobile station 100 successfully acquires the time information, the display unit 160 displays a standby screen 163. The standby screen 163 displays that the clock of the internal clock is set. On the other hand, if the mobile station 100 fails to acquire the time information, the display unit 160 displays a setting screen 164. The setting screen 164 displays that the user is required to input the current time. When the user inputs the current time, the time input to the internal clock is set. After that, the display unit 160 displays the standby screen 163.

According to the mobile communication system according to the present embodiment, the mobile station 100 may flexibly acquire the time information from the surrounding radio access networks 20 and 30. That is, if the time information is broadcast by one of the radio access networks, the time information may be acquired. At this time, the mobile station 100 is unnecessary to recognize which radio access network broadcasts the time information. Accordingly, the mobile station 100 may flexibly correspond to the communication method in both a case where the time information is broadcast and a case where the time information is not broadcast.

By continuously learning the communication method with a higher possibility of acquiring the time information, the mobile station 100 may properly determine the radio access network to be preferentially connected, so that the time required for the search may be shortened. The learning on each country or region makes it possible to perform appropriate determination with consideration of specific circumstances of the country or region.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A radio communication apparatus, comprising:
a radio communication unit configured to search for a connectable radio access network to be connected to and receive broadcast information of a connected radio access network; and
a control unit configured to connect the radio communication unit to a first radio access network detected by the search, check whether or not the broadcast information of the first radio access network includes time of day information, and connect the radio communication unit to a second radio access network detected by the search only when the broadcast information of the first radio access network does not include the time of day information,
wherein when the control unit confirms that the broadcast information does not include the time of day information with respect to all of the radio access networks detected by the search, a user is prompted to input a time of day.

2. The radio communication apparatus according to claim 1, wherein the radio communication apparatus comprises a memory unit that stores information in which a communication method of the connected radio access network is associated with a check result indicating whether or not time of day information is included in the broadcast information,
and wherein the control unit selects the first radio access network based on information stored in the memory unit.

3. The radio communication apparatus according to claim 2, wherein the broadcast information includes identification information indicating an area in which a radio access network is provided, wherein the memory unit stores information in which the communication method is associated with the check result for each area,
and wherein the control unit selects the first radio access network based on the information, which corresponds to a current area, stored in the memory unit.

4. The radio communication apparatus according to claim 1, wherein the control unit selects the first radio access network to be connected according to a communication quality of each radio access network detected by the search.

5. The radio communication apparatus according to claim 1, wherein the radio communication unit is connected to the second radio access network after disconnecting a connection to the first radio access network.

6. A radio communication method, comprising:
searching for a connectable radio access network;
connecting to a first access network detected by the search to receive broadcast information of the first radio access network;
checking whether or not the received broadcast information includes time of day information and connecting to a second radio access network detected by the search only when the received broadcast information does not include the time of day information; and
when the broadcast information does not include the time of day information with respect to all of the radio access networks detected by the search, prompting a user to input a time of day.

* * * * *